United States Patent
Costa et al.

(10) Patent No.: US 11,785,631 B1
(45) Date of Patent: Oct. 10, 2023

(54) PREDICTIVE MODEL FOR HIGH-CAPACITY FREQUENCIES IN MOBILE BROADBAND

(71) Applicant: T-Mobile Innovations LLC, Overland Park, KS (US)

(72) Inventors: Julio C. Costa, Tampa, FL (US); Emile Minh Tran, Sammamish, WA (US); Vikas Ranjan, Bellevue, WA (US); Syed Umair Ahmed, Dublin, CA (US); Antoine Tran, Bellevue, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 222 days.

(21) Appl. No.: 17/402,101

(22) Filed: Aug. 13, 2021

(51) Int. Cl.
  *H04W 24/02* (2009.01)
  *H04W 72/542* (2023.01)
  *H04W 72/0453* (2023.01)
  *H04B 17/309* (2015.01)
  *H04B 17/391* (2015.01)

(52) U.S. Cl.
  CPC ........ *H04W 72/542* (2023.01); *H04B 17/309* (2015.01); *H04B 17/3913* (2015.01); *H04W 24/02* (2013.01); *H04W 72/0453* (2013.01)

(58) Field of Classification Search
  CPC ... H04W 72/542; H04W 24/02; H04B 17/309
  See application file for complete search history.

(56) References Cited

U.S. PATENT DOCUMENTS

2023/0154332 A1* 5/2023 Nayak .............. G08G 1/096888
  701/301

* cited by examiner

*Primary Examiner* — Sulaiman Nooristany
(74) *Attorney, Agent, or Firm* — SHOOK, HARDY & BACON, L.L.P.

(57) ABSTRACT

A method for a base station in communication with a user device through a wireless communications network is described. The method includes communicating with a user device on a current frequency through a wireless communications network. The method may also include determining, based at least in part on a model, a probability that a higher capacity may be acquired by the user device on a frequency other than the current frequency; predicting a first recommended frequency for the user device that is likely to have a higher capacity than the current frequency; instructing the user device to scan the first recommended frequency; receiving an indication from the user device that the first recommended frequency has a higher capacity than the current frequency; and communicating with the user device on the first recommended frequency.

16 Claims, 6 Drawing Sheets

PREDICTIVE MODEL FOR HIGH-CAPACITY FREQUENCIES IN MOBILE BROADBAND

The present disclosure is directed, in part, to improving the identification and switching to improved frequencies by a user device, such as a cellular phone, in contact with a base station. Various known information is fed into a model that predicts another band and/or frequency to which the user device should switch. The model may predict a likelihood of a higher strength frequency prior to measuring that specific frequency. The model is trained using data over time, so that the model continues to improve with new data.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

Figure 1:
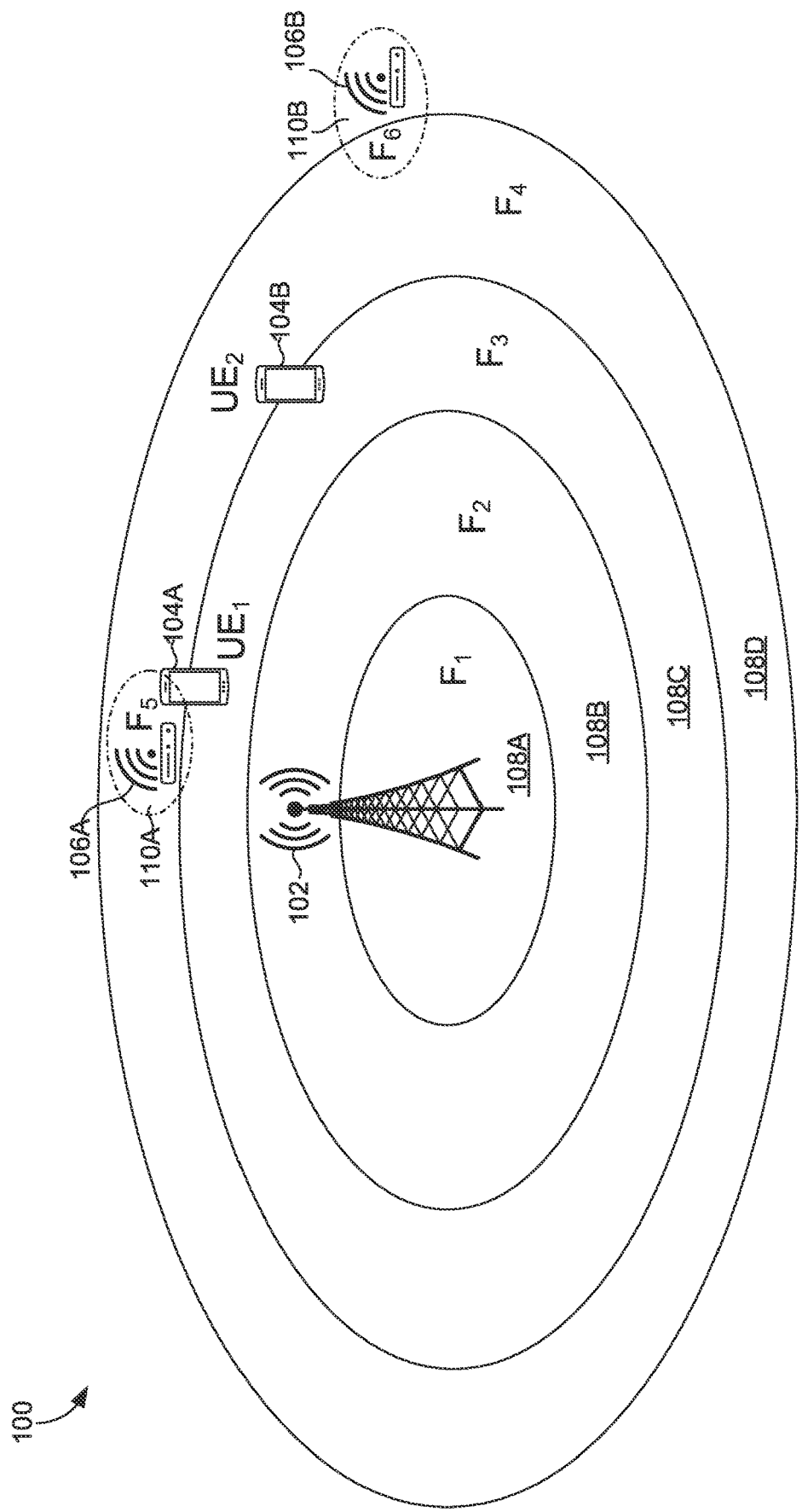
FIG. 1 is a diagram of a wireless communications network in which one or more aspects of the present disclosure may be carried out.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
3GPP Third-Generation Partnership Project
4G Fourth-Generation Cellular Communication System
5G Fifth-Generation Cellular Communication System
CDR Call Drop Rate (or Connection Drop Rate)
CFR Call Fail Rate (or Connection Fail Rate)
CQI Channel Quality Indicator (or Channel Quality Index)
CD-ROM Compact Disk Read Only Memory
CDMA Code Division Multiple Access
eNodeB Evolved Node B
ETSI European Telecommunications Standards Institute
FR Frequency Range
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Signal-to-Interference-Plus-Noise Ratio
SNR Signal-to-Noise Ratio
SON Self-Organizing Networks
SRS Sounding Reference
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, 31st Edition (2018).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional wireless communication network employs one or more base stations to provide wireless access to a network. For example, in a wireless telecommunication network, a plurality of access points, each providing service for a cell or a sector of a cell, are used to transmit and receive wireless signals to/from one or more UEs. An access point may be considered to be one or more otherwise-discrete components comprising an antenna, a radio, and/or a controller, and may be alternatively referred to as a "node," in that it is a point of origin for the communication link between the wired and wireless portions of the communication system. In aspects, a node may be defined by its ability to communicate with a UE according to a single protocol (e.g., 2G, 3G, 4G, LTE, 5G, and the like); however, in other aspects, a single node may communicate with a UE according to multiple protocols.

As used herein, the terms "cell" or "node" may be specific nodes, base stations, or access points that can be considered to be discrete from one another. While cells and nodes may be referred to herein with respect to its protocol, it should be understood that any particular cell or node may be capable of operating in any one or more of any suitable wireless communication protocol, using any one or more frequencies, frequency bands, channels, and the like. The terms "user device," "user equipment," "UE," "mobile device," "mobile handset," and "mobile transmitting element" may be used interchangeably in this description.

Accordingly, a first aspect of the present disclosure is directed to a method for a user device in communication with a base station through a wireless communications network. The method includes determining, based at least in part on a model, a probability that a higher capacity may be acquired on a frequency other than a current frequency. The method may also include predicting, based at least in part on the model, a first recommended frequency and a second recommended frequency that would each have a higher capacity than the current frequency, wherein the first recommended frequency is in a first band and the second recommended frequency is in a second band. The method may further include scanning the first recommended frequency and the second recommended frequency. After completion of the scanning, the method may include determining that the first recommended frequency has a higher capacity than the current frequency and the second recommended frequency. The method may further include instructing the user device to use the first recommended frequency for the communication with the base station.

A second aspect of the present disclosure is directed to a method for a base station in communication with a user device through a wireless communications network. The method includes communicating with a user device on a current frequency through a wireless communications network. The method may also include determining, based at least in part on a model, a probability that a higher capacity may be acquired by the user device on a frequency other than the current frequency. The method may also include predicting, based at least in part on the model, a first recommended frequency for the user device that is likely to have a higher capacity than the current frequency, wherein the first recommended frequency is in a first band and the current frequency is in a second band. The method may also include instructing the user device to scan the first recommended frequency. The method may also include receiving an indication from the user device that the first recommended frequency has a higher capacity than the current frequency. The method may also include instructing the user device to communicate on the first recommended frequency.

A third aspect of the present disclosure is directed to a method communicating with a user device on a current frequency. The method may also include receiving, from the user device, a set of user device information. The method may also include determining, based at least in part on a model and the set of user device information, a probability that a higher capacity may be acquired by the user device on a frequency other than the current frequency. The method may also include predicting, based at least in part on the model and the set of user device information, a first recommended frequency for the user device that is likely to have a higher capacity than the current frequency, wherein the first recommended frequency is in a first band and the current frequency is in a second band. The method may also include instructing the user device to scan the first recommended frequency. The method may also include receiving an indication from the user device that the first recommended frequency has a higher capacity than the current frequency. The method may also include communicating with the user device on the first recommended frequency. The method may also include updating the model with information indicative of the first recommended frequency and the set of user device information.

According to another aspect of the technology described herein, a system may include a base station and a user device in communication with the base station. The base station and the user device may each perform one or more of the steps described herein. According to yet another aspect of the technology described herein, a non-transitory computer readable storage medium having a computer program stored thereon. When executed by one or more processors, the computer program instructs the one or more processors to perform one or more of the steps described herein.

Referring to FIG. 1, a diagram of a wireless communications network 100 in which one or more aspects of the present disclosure may be carried out is depicted. The diagram may illustrate one or more features and an example environment for embodiments of the present disclosure. Wireless communications network 100 is shown as having a number of components and associated devices therein. The wireless communications network 100 includes base station

102. Base station 102 communicates with one or more UEs 104 (shown as 104A and 104B in FIG. 1) that are disposed within a coverage range of the base station 102. The wireless communications network 100 may also include one or more distributed stations 106 (shown as 106A and 106B in FIG. 1) that may be partially or fully within the coverage area of the base station 102. The base station 102 projects one or more frequency regions 108 (shown as 108A-D) that include at least a portion of a band including one or more frequencies that the UE 104 may use to communicate with the base station 102. Similarly, the distributed stations 106 may also project a distributed frequency region.

Wireless communications network 100 may be a 5G network, a 4G network, or other communications network. The wireless communications network 100 facilitates communication between the UEs 104 and an external computing device, via the base station 102 and/or the distributed stations 106. The wireless communications network 100 may facilitate phone calls, text messages, Internet access, and/or other communications.

The base station 102 may assist the UE 104 in accessing the wireless communications network 100. This connection to the wireless communications network 100 may be described in the ETSI 125-136 series and/or the 3GPP 25/36 series specifications. The base station 102 may assist the UE 104 by providing network-selection assistance data to the UE 104. The network-selection assistance data is indicative of a recommended frequency or frequencies that the base station 102 recommends for the UE 104. For example, a low-band frequency may have more coverage than a high-band frequency or a mid-band frequency. The base station 102 may communicate, across the low-band frequency, that UEs 104 receiving the message on the low-band frequency should instead switch to one or more high-band frequencies. In some embodiments, the base station 102 may instruct the specific high-band frequencies to be used based upon calculations via a model (discussed below) at the base station 102 or other network component. In other embodiments, the base station 102 may instruct the UE 104 to determine the frequency via a model on the UE 104. The base station 102 may provide the model to the UE 104 for such calculations, or the UE 104 may receive the model from some other origin.

The UE 104 may also be referred to as a user device, a cell phone, a smart phone, or the like. The term "user equipment" or "UE" may be described in the Universal Mobile Telecommunications System (UTMS) and/or the 3GPP Long Term Evolution (LTE) as any electronic device utilized directly by an end-user to communicate. Examples include a hand-help smart phone, a traditional cellular phone, a laptop computer equipped with a mobile broadband router (external or internal), a tablet computer with a mobile broadband router, etc.

Distributed station 106 may cover a relatively small geographic area with the distributed frequency region 110, compared with the frequency regions 108 of the base station 102. The distributed station 106 may be unaffiliated with the base station 102 and/or may be temporary. The distributed station 106 may also be referred to as an "unplanned cell," a "femtocell", a "pico cell," a "micro cell," a "metro cell," a "small cell," a "fixed relay," or the like. For example, a femtocell may be disposed in a home or business and provide coverage for up to 32 users in a range of up to 100 meters. As another example, a pico cell may be disposed in a large shopping mall or airport and provide coverage for up to 128 users in a range of up to 200 meters. As yet another example, a micro cell may be disposed in a large urban area to fill coverage gaps between base stations 102 and provide coverage for up to 256 users in a range of up to 1000 meters.

Especially with the implementation of 5G, unplanned and irregular placements of access nodes (including the base station 102 and the distributed stations 106) may become more common due to the impassability and limited range of the high-frequency signals. For example, the distributed stations 106 may be placed in common public areas such as restaurants and shopping malls to supplement weaker signals from a base station 102. This arrangement of base stations 102 and distributed stations 106 may be referred to as a heterogeneous network environment. Thus, embodiments of the invention assist the user device in identifying and connecting to these distributed stations 106 in a heterogeneous network environment.

Frequency regions 108 and distributed frequency regions 110 are geographic areas covered by at least a portion of a certain frequency band. For example, frequency region F1 may be covered by a first band, frequency region F2 may be covered by a second band, distributed frequency region F5 may be covered by a third band, etc. While in FIG. 1 these frequency regions 108 and distributed frequency regions 110 are shown as ovals, in reality the frequency regions 108 and distributed frequency regions 110 often have an irregular shape due to the terrain, buildings, and other physical features in the geographic location. The frequency regions 108 and distributed frequency regions 110 are also not constant in size and shape and can change due to changing conditions such as weather, interference, and other equipment. Specifically, higher frequency 5G signals are less likely to penetrate solid objects such as walls and trees at least in part because of the nature of high-frequency electromagnetic waves.

An example embodiment of the present disclosure shown in FIG. 1 will now be discussed. In this example, UE1 104A is disposed near a border between frequency region F3 108C and frequency region F4 108D, but is also on a border with distributed frequency region F5 110A. The base station 102 may or may not have information related to the presence of the distributed frequency region F5 110A, because the corresponding distributed station 106A may be unaffiliated with the base station 102 and/or may be temporary. Also, the changing local conditions may also affect the size and shape of distributed frequency region F5 110A.

To continue the example, if UE1 104A is detecting frequency range F3 108C and frequency range F4 108D, the model may recommend that UE1 104A scan for distributed frequency range F5 110A. This is because previous iterations of the model would have included distributed frequency range F5 110A as a potential frequency region for utilization. In some embodiments, the model is on the UE 104 which identifies the UE 104 may be located in distributed frequency range F5 110A and that the frequency or frequencies associated with distributed frequency region F5 110A are a potential improved band for communicating. In other embodiments, the model is on the base station 102, which instructs the UE1 104A to attempt to connect to the frequency or frequencies associated with distributed frequency region F5 110A.

To continue the example, if UE2 104B is also detecting frequency region F3 108C and frequency region F4 108D, but the geographic location of UE2 104B is far from the geographic location of UE1 104A, the model may not recommend that UE2 104B scan for distributed frequency region F5 110A because the distributed frequency region F5 110A has a limited geographic coverage area. Instead, the model may have information about distributed frequency region F6 110B that is geographically closer to UE2 104B. Thus, the model may recommend that UE2 104B scan for distribute frequency region F6 110B. However, UE2 104B may find that the capacity (and/or other attribute) of the distributed frequency region F6 110B is inferior to the current frequency region F3 108C. As such, the model may be updated with this information such that future iterations can refine the geographic coverage area of distributed frequency region F6 110B.

Figure 2:
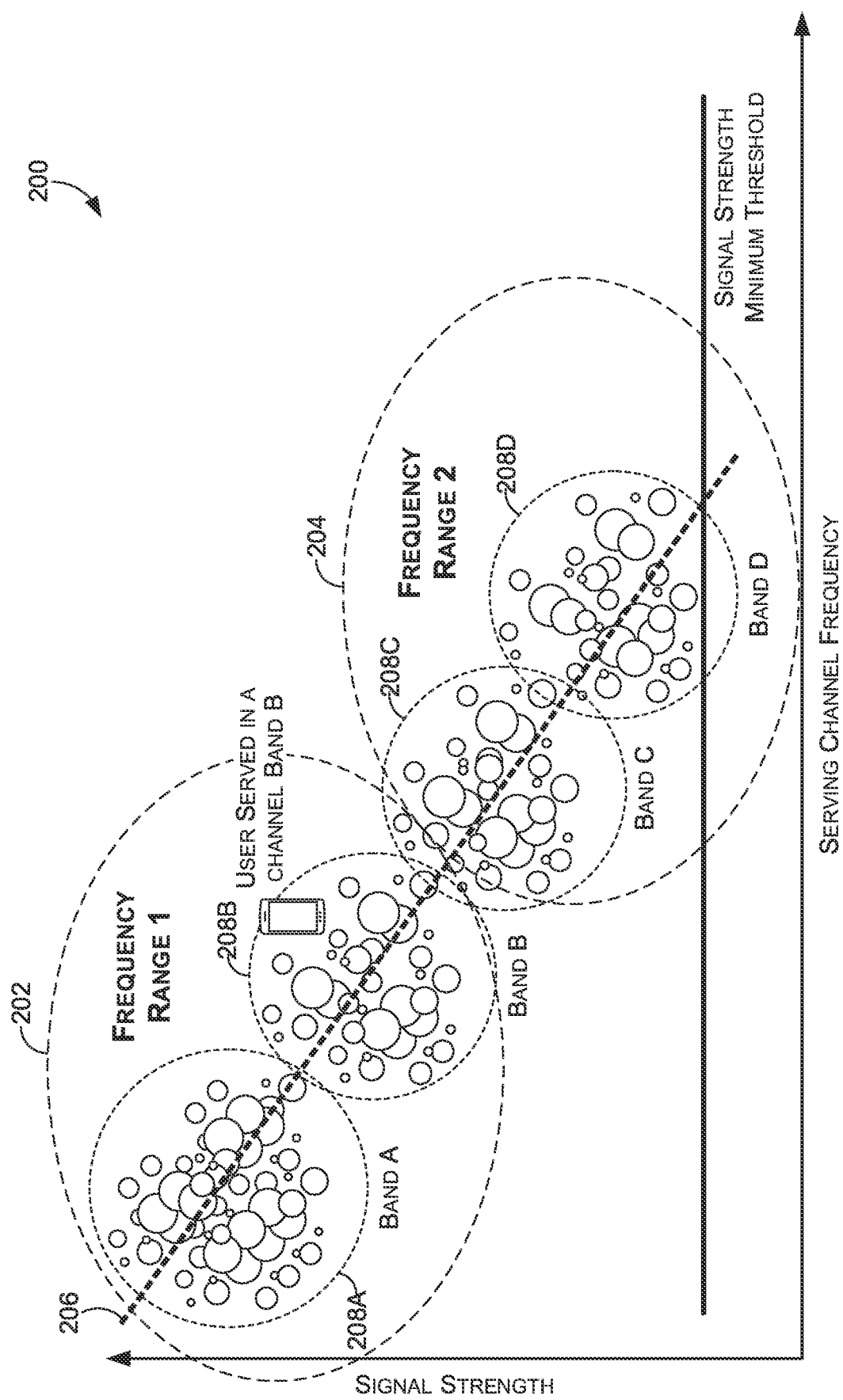
FIG. 2 is a graphical representation of an example showing a comparison of signal strength and signal frequency with a regression line.

Referring to FIG. 2, a graphical representation 200 is shown of a comparison of signal strength and signal frequency. In the graphical representation 200, the y-axis of the graph is signal strength and the x-axis of the graph is Serving Channel frequency. Historical data 202 populates the graphical representation 200. The historical data 202 are part of a model that is used in recommending new frequencies for the UE. In the graphical representation 200, there is also a signal strength minimum threshold. As the historical data increases in frequency (e.g., moving right across FIG. 2), a corresponding loss of signal strength is expected. However, so long as the signal strength remains above the minimum threshold these frequencies may be recommended (as discussed below) due at least in part to increased capacity at the higher frequencies.

With the advent of 5G, additional frequency ranges are available for use. In previous iterations (4G, 3G, etc.), a single frequency range was utilized. Specifically, this single frequency range 202 is Frequency Range 1 in FIG. 2. 5G introduced Frequency Range 2 204 in FIG. 2. It may be advantageous to direct UEs capable of 5G to use Frequency Range 2 204 when possible. Frequency Range 1 202 may have less capacity while Frequency Range 2 204 has more capacity. Frequency Range 2 204 may be in a range of 28-39 GHz, above 24 GHz, or some other range. The higher the frequency correlates to a greater capacity to support high data-transfer speeds.

In embodiments of the invention, the method is implemented if the UE is currently operating in Frequency Range 1 202 and will recommend one or more frequencies in Frequency Range 2 204 so as to increase capacity. In embodiments of the invention, the method includes a step of determining that the UE is in a first frequency range and, if so, will recommend one or more frequencies in a second frequency range that is higher than the first frequency range.

The model, as discussed below, assists in making a prediction to determine if there is a higher frequency, specifically in Frequency Range 2 204, likely to have a greater capacity despite the lower signal strength. For example, in FIG. 2, the UE is shown in a channel of Band B 208B. The model may predict possible available channels in Band D 208D, based upon the various criteria considered and calculated.

Figure 3:
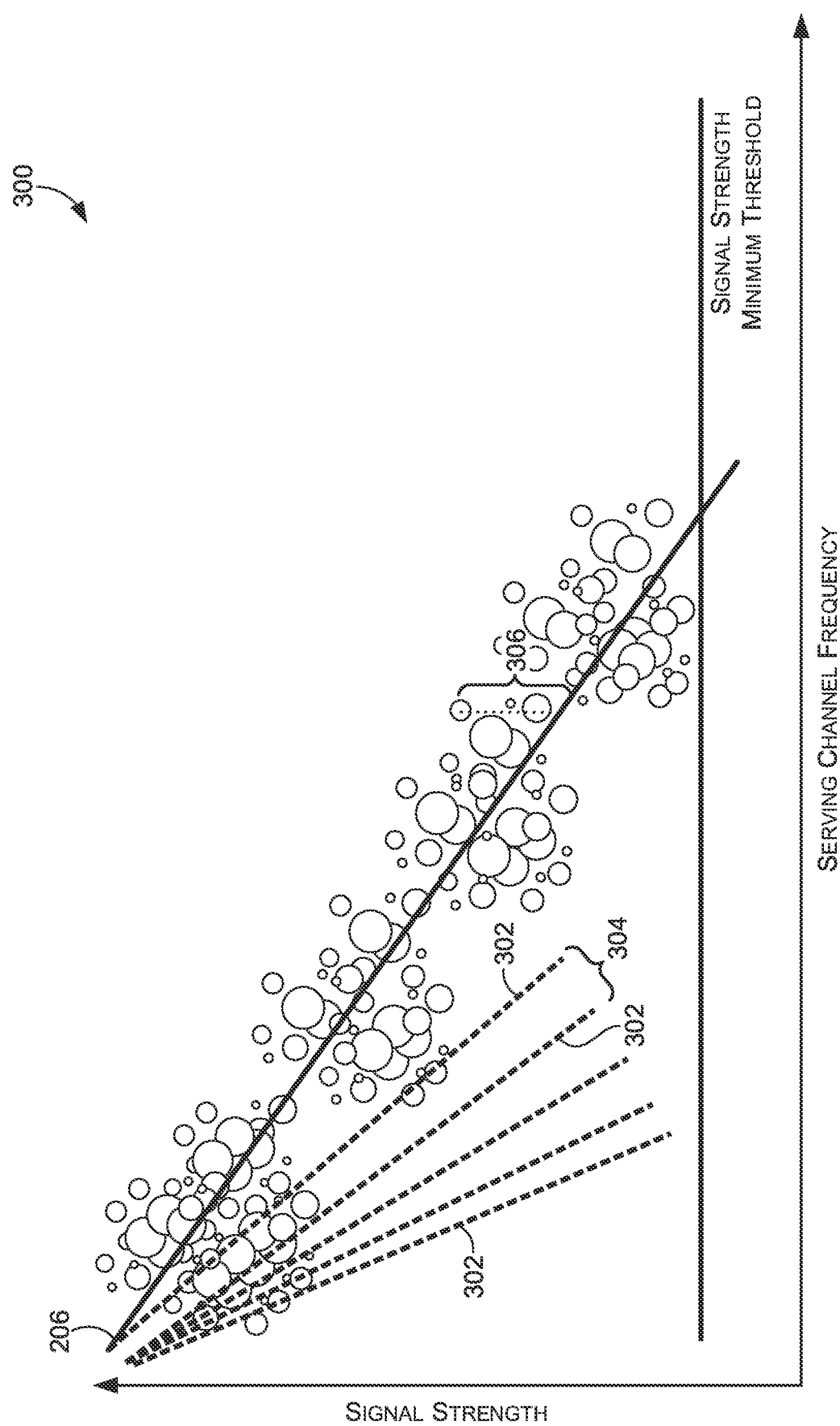
FIG. 3 is a graphical representation showing how the regression line of FIG. 2 is determined.

The graphical representation 200 includes a regression line 206. The regression line 206 is determined based at least in part on the model, which determines where to place the regression line 206 so as to determine what frequencies to recommend. This is shown in FIG. 3. The regression line 206 is hypothetical and may change based upon updates to the model with new historical data 202.

The frequency range 204 may include one or more bands 208 (shown as 208A-D in FIG. 2). The bands include a plurality of frequencies. The bands may include one or more frequency regions 108 from FIG. 1. The bands 208 may overlap two or more frequency ranges 204, such as Band C 208C in FIG. 2. The band 208 is a cluster of historical data. There are numerous bands used in 5G, but a common one is above 24 GHz.

FIG. 3 is a graphical representation showing how the regression line 206 of FIG. 2 is determined. FIG. 3 includes a graphical representation 300 similar to the graphical representation 200 of FIG. 2. A series of potential regression lines 302 are considered by the model. In embodiments of the invention, the model determines the regression line 206 from two or more potential regression lines 302. The potential regression lines 302 are separated by an interval.

Also shown in FIG. 3 is an error 306 between a current data 308 and the regression line 206. The model predicted that the current data 308 would lie along the regression line 206 for a give serving channel frequency. Any change in the signal strength relative to the regression line 206 is an error 306 in the calculation. The error 306 may be based upon an incomplete or incorrect model (resulting in an errant regression line 206), upon incomplete or incorrect information being inserted into the model, or upon other factors. In some instances, the error 306 may be a positive error (having a stronger signal strength than expected, as shown in FIG. 3) or a negative error (having a weaker signal strength than expected, not illustrated).

Figure 4:
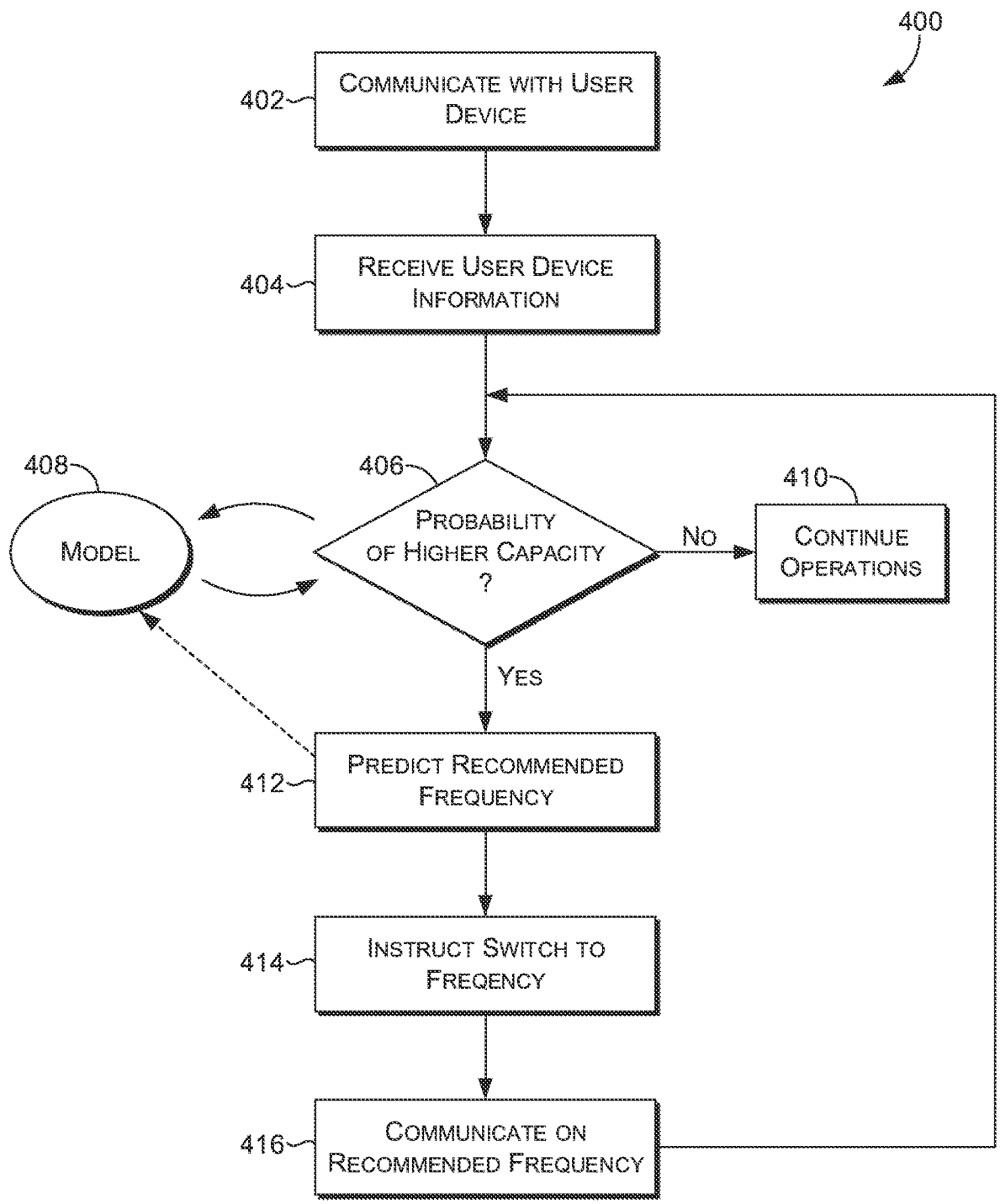
FIG. 4 is a flow diagram of one aspect of a method of predicting and implementing a recommended frequency to increase signal strength.

FIG. 4 depicts a flow diagram of an exemplary method 400 for recommending and adopting new frequencies for a UE on a wireless communications network. Steps of the method may be performed by the UE, by the base station, by a distributed station, or by some combination thereof. The steps may also be performed in any order. Two or more steps may be performed simultaneously.

In some embodiments, the method may begin upon a certain condition or threshold being met. If the UE is communicating on a low frequency, there may be a high probability that a higher frequency will still meet the signal strength threshold while providing increased capacity. In some embodiments, the method may be performed when a communicating frequency (e.g., a current frequency) is below a certain threshold, within a certain band, or within a certain frequency range (such as Frequency Range 1).

At step 402, the station (e.g., the base station 102 or distributed station 106 of FIG. 1) communicates with the user device. The communication is over a current frequency on a mobile communications network, such as mobile communications network 100 of FIG. 1. In some embodiments, this is upon first contact between the UE and the station and may be initiated by the UE or by the station.

At step 404, the station receives user device information. The user device information is indicative of properties of the user device that may affect which frequencies would be an improvement. The user device information may include a UE manufacturer name, a UE model name or number, a type of antenna or information about the antenna, a type of processor. The user device information may include status information, such as a current operational mode of the UE, a current geographic location of the UE, a current signal strength received, a current speed and direction of travel, and other information. The user device information may also include historical information from the UE such as previous frequencies utilized.

At step 406, the base station determines a probability of a higher capacity at least partially through utilizing the model. In some embodiments, the base station may consult a model 408 to calculate a likelihood of the higher capacity. If, at step 406, the base station determines that the probability of a higher capacity is under a certain threshold, at step 410 the station and/or UE will continue normal operations. In continuing normal operations, communications between the station and the UE will continue on the current frequency.

If, at step 406, the base station determines that the probability of a higher capacity is over a certain threshold, at step 412, the station and/or the UE will predict a recommended frequency. In some embodiments, the model will predict a certain number of frequencies and then determine the likelihood that the UE 104 will attain a signal with more capacity on that frequency. In other embodiments, the model will determine the one or more recommended frequencies after determining that the likelihood of such frequency is over the above-discussed threshold. The recommended frequency is along the regression line in FIG. 2. The regression line is determined by the model.

At step 414, the user device will adopt the recommended frequency. In some embodiments, the base station will instruct the user device to switch to the recommended frequency. In other embodiments, the distributed station will instruct the user device to switch to the recommended frequency. In still other embodiments, the user device will switch to the recommended frequency without any external instruction.

At step 416, the base station will communicate with the user device on the recommended frequency. This step may include one or more measurements to determine if the recommended frequency is superior to the prior current frequency, as was predicted by the model.

In embodiments, one or more of the above-discussed steps may be performed by the user device. In other embodiments, the above-discussed steps may be performed by a combination of the base station and the user device. In still other embodiments, the above may be performed by the distributed station.

In some embodiments, the method may further include creating and/or refining the model. Refining the model may include collecting numerous, e.g., millions, of data points. Optimizing the model may include varying the weights on different factors, adding new historical data, and the like.

Figure 5:
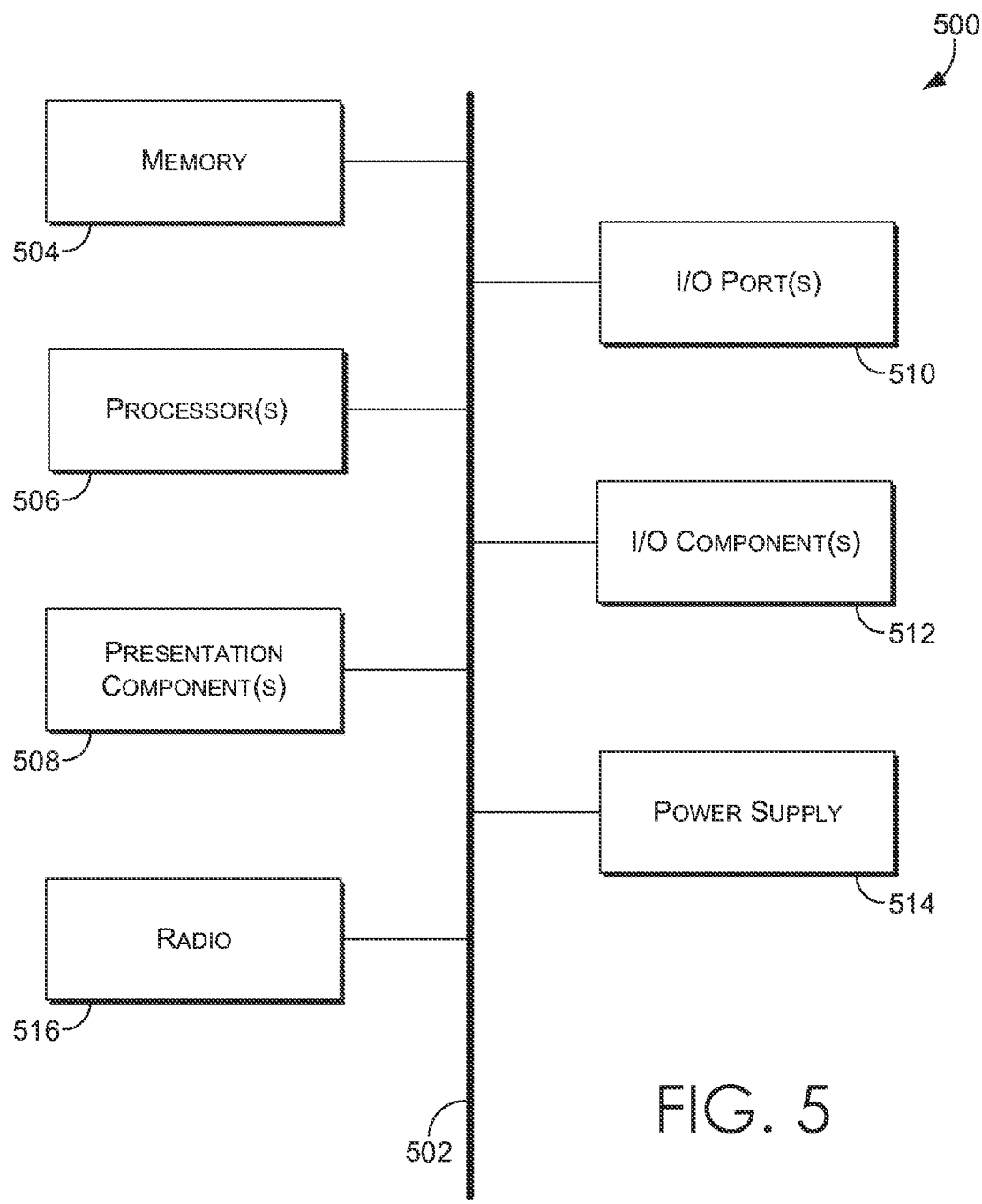
FIG. 5 is a diagram of a computing environment suitable for use in implementations of the present disclosure.

Referring to FIG. 5, a diagram is depicted of an exemplary computing environment suitable for use in implementations of the present disclosure. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or as requirement relating to any one or combination of components illustrated. In aspects, the computing device 500 may be a UE 104, WCD, or other user device, capable of two-way wireless communications with an access point. Some non-limiting examples of the computing device 500 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 502 that directly or indirectly couples the following devices: memory 504, one or more processors 506, one or more presentation components 508, input/output (I/O) ports 510, I/O components 512, and power supply 514. Bus 502 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 512. Also, processors, such as one or more processors 506, have memory.

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, nonremovable, or a combination thereof. Exemplary memory includes solid-state memory, hard drives, optical-disc drives, etc. Computing device 500 includes one or more processors 506 that read data from various entities such as bus 502, memory 504 or I/O components 512. One or more presentation components 508 presents data indications to a person or other device. Exemplary one or more presentation components 508 include a display device, speaker, printing component, vibrating component, etc. I/O ports 510 allow computing device 500 to be logically coupled to other devices including I/O components 512, some of which may be built in computing device 500. Illustrative I/O components 512 include a microphone, joystick, game pad, satellite dish, scanner, printer, wireless device, etc.

Radio 516 represents a radio that facilitates communication with a wireless communications network. In aspects, the radio 516 utilizes one or more transmitters, receivers, and antennas to communicate with the wireless communications network on a first downlink/uplink channel. Though only one radio is depicted in FIG. 1, it is expressly conceived that the computing device 500 may have more than one radio, and/or more than one transmitter, receiver, and antenna for the purposes of communicating with the wireless communications network on multiple discrete downlink/uplink channels, at one or more wireless nodes. Illustrative wireless telecommunications technologies include CDMA, GPRS, TDMA, GSM, and the like. Radio 516 might additionally or alternatively facilitate other types of wireless communications including Wi-Fi, WiMAX, LTE, or other VoIP communications. As can be appreciated, in various embodiments, radio 516 can be configured to support multiple technologies and/or multiple radios can be utilized to support multiple technologies. A wireless communications network might include an array of devices, which are not shown so as to not obscure more relevant aspects of the invention. Components such as a base station 102, a communications tower, or even access points (as well as other components) can provide wireless connectivity in some embodiments.

Figure 6:
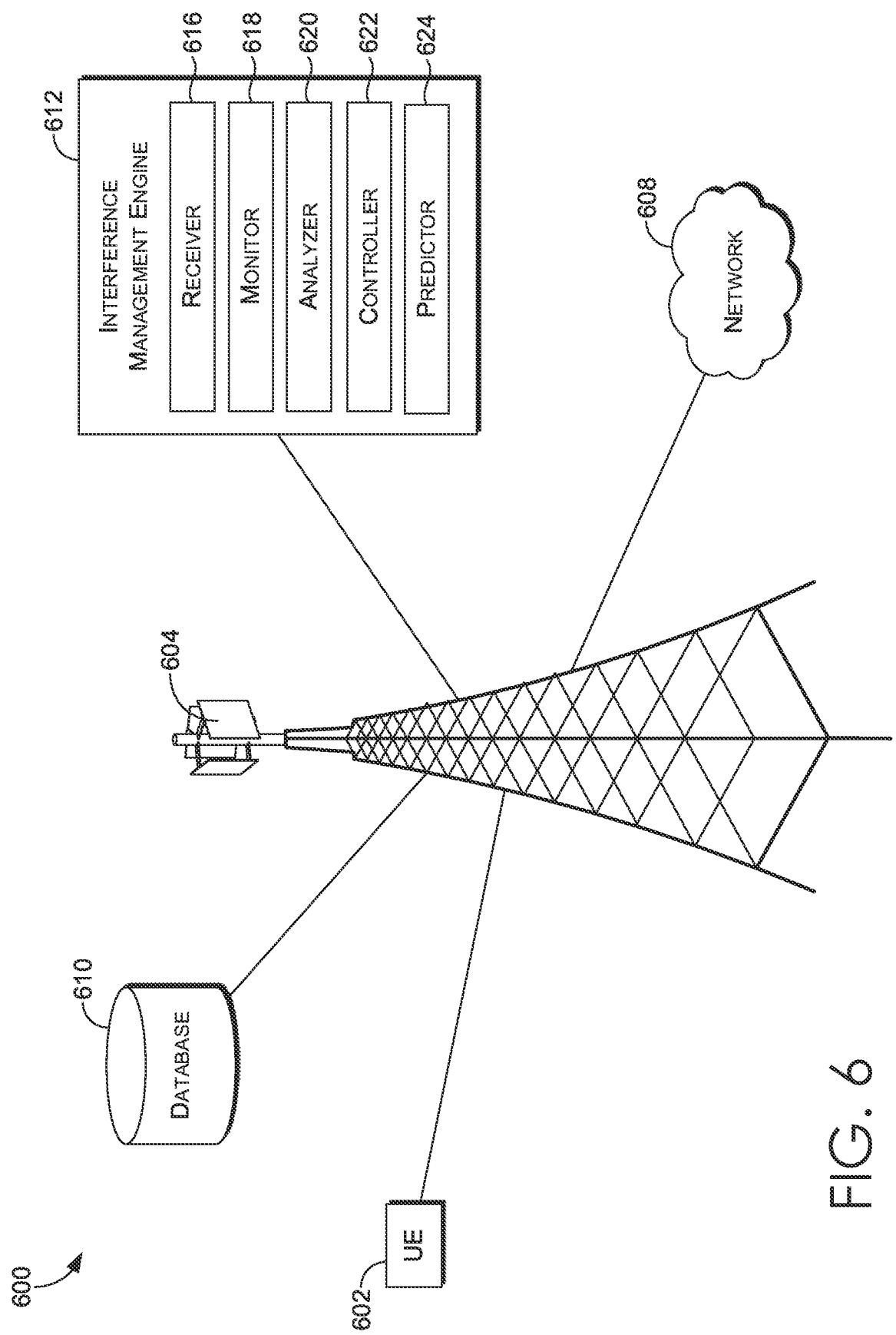
FIG. 6 illustrates a network environment in which implementations of the present disclosure may be employed.

FIG. 6 provides an exemplary network environment in which implementations of the present disclosure may be employed. Such a network environment is illustrated and designated generally as network environment 600. Network environment 600 is but one example of a suitable network environment and is not intended to suggest any limitation as to the scope of use or functionality of the invention. Neither should the network environment be interpreted as having any dependency or requirement relating to any one or combination of components illustrated.

Network environment 600 includes user device 602, a first node 604, network 608, database 610, and interference management engine 612. In network environment 600, the user device 602 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 500) that wirelessly communicates via with a node of the wireless network, such as the first node 604, in order to interact with one or more components of the network 608.

In some aspects, the user device 602 can correspond to computing device 500 in FIG. 1. Thus, a user device can include, for example, a display(s), a power source(s) (e.g., a battery), a data store(s), a speaker(s), memory, a buffer(s), a radio(s) and the like. In some implementations, the user device 602 comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network. Further, the user device 602 may communicate with the node 604 on any one or more frequencies, frequency bands, channels, or the like. Though only the node 604 is depicted in FIG. 2, it should be understood that the user device 602 may be capable of connecting to any one or more of a plurality of nodes, using any one or more of a plurality of communication protocols, on any one or more of a plurality of frequencies.

In some cases, the user device 602 in network environment 600 can optionally utilize network 608 to communicate with other computing devices (e.g., a mobile device(s), a server(s), a personal computer(s), etc.) through the node 604. The network 608 may be a communications network(s), or a portion thereof. A communications network might include an array of devices or components (e.g., one or more base stations 102), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network 608 can include multiple networks, as well as being a network of networks, but is shown in more simple form so as to not obscure other aspects of the present disclosure.

Network 608 can be part of a telecommunication network that connects subscribers to their immediate service provider. In some instances, network 608 can be associated with a telecommunications provider that provides services (e.g., voice, data, SMS) to user devices, such as user device 602. For example, network 608 may provide voice, SMS, and/or data services to user devices or corresponding users that are registered or subscribed to utilize the services provided by a telecommunications provider. Network 608 can comprise any one or more communication networks providing voice, SMS, and/or data service(s), such as, for example, a 1x circuit voice, a 3G network (e.g., CDMA, CDMA2000, WCDMA, GSM, UMTS), a 4G network (WiMAX, LTE, HSDPA), or a 5G network.

In some implementations, the first node 604 is configured to communicate with user devices, such as the user device 602 that are located within the geographical area, or cell, covered by the one or more antennas of the first node 604. Though referred to as a node for simplicity, the first node 604 may include (or be communicatively coupled to) one or more base stations 102, nodes, base transmitter stations, radios, antennas, antenna arrays, power amplifiers, transmitters/receivers, digital signal processors, control electronics, GPS equipment, and the like. In particular, the node 604 may transmit a downlink signal to the user device 602 in an effort to establish a wireless communication session. The user device 602 may perform a cell selection/reselection procedure wherein the user device 602 makes various determinations, measurements, and/or observations about one or more network parameters. If the user device 602 selects (or reselects) the cell comprising node 604, the user device 602 may, in return, attempt to communicate an uplink signal back to the node 604.

The first node 604 may be in communication with the interference management engine 612, which comprises various components that are utilized, in various implementations, to perform one or more methods for managing uplink interference in high noise environments. In some implementations, such as the one depicted in FIG. 6, the interference management engine 612 comprises components including a receiver 616, a monitor 618, an analyzer 620, a controller 622, and a predictor 624. However, in other implementations, more or less components than those shown in FIG. 6 may be utilized to carry out aspects of the invention described herein. Though shown as a separate entity, the interference management engine 612 may take the form of one or more software stacks, modules, applications, etc., may be executed and/or located at a single location or a plurality of locations, and may executed by one or more network components, or may provide instructions for execution at a location remote to the interference management engine.

The receiver 616 of the interference management engine 612 is generally responsible for receiving information and/or indications from various network components and/or user devices that may be relevant for making uplink interference management decisions. For example the receiver 616 may receive a plurality of RF signals in the uplink. Said received RF signals may comprise external interference, inter-modulation interference, inter-nodal interference, thermal noise, jamming RF, uplink transmissions from a user device, or the like. The receiver 616 may communicate said information to one or more of the monitor 618, the analyzer 620, or the controller 622. The monitor 618 of the interference management engine 612 is generally responsible for monitoring signal strength of the received RF signals in the uplink and one or more network parameters of the wireless communication links between the node 604 and the user device 602. The one or more network parameters may comprise a frequency, channel, frequency band, wireless communication protocol, selected cell, or the like. The monitor 618 may communicate said information to one or more of the analyzer 620 and the controller 622.

The analyzer 620 may receive an indication from the monitor that the node 604 has received RF signals in the uplink having a particular reference signal strength indicator (RSSI). The monitored RSSI may be a moving average (e.g., having a periodicity of 1, 5, 10, 15, or 30 minutes) or may be an instantaneous RSSI associated with a particular time. In another aspect, the monitored RSSI may be a real-time or near real-time RSSI observed by any one or more components, such as the monitor 618 and/or the analyzer 620. The analyzer 620 may compare the monitored RSSI to a predetermined reference RSSI. The reference RSSI may be set at any level that is desirable for a network, with the understanding that increases to the reference RSSI may delay the triggering of an interference mitigation procedure. In aspects, the reference RSSI may comprise a plurality of discrete levels; for example, a first reference RSSI may be used under a first condition (e.g., non-busy hours, such as overnight) and a second reference RSSI may be used under a second condition (e.g., busy hours, such as rush hour). In yet another aspect, the reference RSSI may be dynamic; that is, the reference RSSI may change in response to a change in one or more historical (e.g., over the past 24 hours, 48 hours, week, etc.), observed (e.g., real time or near real time), and/or forecasted network parameters (e.g., RSSI, CDR or CFR, CQI, SINR, SRS, etc.).

In one aspect the analyzer 620 may establish the reference RSSI as the average noise floor in the network 600 (e.g., −95 dBm). If the monitored RSSI exceeds the reference RSSI, the analyzer 620 may determine that the user device 602 is disposed in a high noise environment, with respect to the node 604 and proceed to initiate one or more interference mitigation procedures.

The predictor 624 may perform any of the steps discussed above in regards to FIG. 4. These steps may include communicating with the user device, receiving user information, determining a probability of a higher capacity, predicting the recommended frequency, and instructing the user device to switch to that recommended frequency.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A method comprising:
determining, for a user device in communication with a base station through a wireless communications network and based at least in part on a model, a probability that a higher capacity may be acquired on a frequency other than a current frequency;
predicting, based at least in part on the model, that a first recommended frequency and a second recompensed frequency have a higher signal capacity than the current frequency,
wherein the first recommended frequency is in a first band and the second recommended frequency is in a second band;
scanning the first recommended frequency and the second recommended frequency;
determining that the first recommended frequency has a higher capacity than the current frequency and the second recommended frequency; and instructing the user device to use the rust recommended frequency;
wherein the model includes a gradient descent algorithm for determining a regression line to provide the least cost of frequencies:
wherein the model refines the regression line so as to minimize the estimated error.

2. The method of claim 1, wherein the first recommended frequency is in a first channel and the second recommended frequency is in a second channel.

3. The method of claim 1, wherein the first recommended frequency is higher than the current frequency.

4. The method of claim 1, wherein the second recommended frequency is lower than the first recommended frequency and higher than the current frequency.

5. The method of claim 1, wherein the first recommend frequency is determined based at least in part on a set of user device information.

6. The method of claim 5, wherein the set of user device information includes physical properties of the user device.

7. A method comprising:
communicating with a user device on a current frequency by way of a base station through a wireless communications network;
determining, based at least in part on a model, a probability that a higher capacity may be acquired by the user device on a frequency other than the current frequency;

predicting, based at least in part on the model, a first recommended frequency for the user device that is likely to have a higher capacity than the current frequency, wherein the first recommended frequency is in a first band and the current frequency is in a second band;

instructing the user device to scan the first recommended frequency; receiving an indication from the user device that the first recommended frequency has a higher capacity than the current frequency; and instructing the user device to use the first recommended frequency;

wherein the model includes a gradient descent algorithm for determining a regression line to provide the least cost of frequencies, and wherein the model refines the regression line so as to minimize the estimated error.

8. The method of claim 7, further comprising:

receiving, from the user device, a set of device information, wherein the first recommended frequency is determined based at least in part on the set of device information.

9. The method of claim 7, wherein the first recommended frequency is in a first channel and the current frequency is in a second channel.

10. The method of claim 7, wherein the first recommended frequency is higher than the current frequency.

11. The method of claim 7, wherein the first recommend frequency is determined based at least in part on a set of user device information received from the user device, and wherein the set of user device information includes physical properties of the user device.

12. A method comprising: communicating, by way of a base station through a wireless communications network, with a user device on a current frequency;

receiving, from the user device, a set of user device information; determining, based at least in part on a model and the set of user device information, a probability that a higher capacity may be acquired by the user device on a frequency other than the current frequency;

predicting, based at least in part on the model and the set of user device information, a first recommended frequency for the user device that is likely to have a higher capacity than the current frequency, wherein the first recommended frequency is in a first band and the current frequency is in a second band;

instructing the user device to scan the first recommended frequency;

receiving an indication from the user device that the first recommended frequency has a higher capacity than the current frequency; communicating with the user device on the first recommended frequency; and updating the model with information indicative of the first recommended frequency and the set of user device information;

wherein the model includes a gradient descent algorithm for determining a regression line to provide the least cost of frequencies, and wherein the model refines the regression line so as to minimize the estimated error.

13. The method of claim 12, wherein the first recommended frequency is in a first channel and the current frequency is in a second channel.

14. The method of claim 12, wherein the first recommended frequency is higher than the current frequency.

15. The method of claim 12, wherein the set of user device information includes physical properties of an antenna of the user device.

16. The method of claim 12, wherein the step of updating the model includes changing a slope and a positioning of the regression line.

* * * * *